United States Patent [19]
Pascouet

[11] 4,344,903
[45] Aug. 17, 1982

[54] METHOD OF MAKING A CELLULAR POLYMERIC RESIN BODY IN A SELF CONTAINED HIGH-PRESSURE MOLD FORM

[76] Inventor: Maurice Y. Pascouet, 67-66 108th St., Forest Hills, N.Y. 11375

[21] Appl. No.: 227,615

[22] Filed: Jan. 23, 1981

Related U.S. Application Data

[63] Continuation of Ser. No. 929,790, Jul. 31, 1978, abandoned.

[51] Int. Cl.³ .............................................. B29D 27/00
[52] U.S. Cl. ........................................ 264/55; 249/79; 264/54; 264/DIG. 3; 264/DIG. 5; 264/DIG. 60
[58] Field of Search ...................... 264/55, DIG. 3, 51, 264/54, DIG. 5, DIG. 60; 249/78, 79

[56] References Cited

U.S. PATENT DOCUMENTS

| | | | |
|---|---|---|---|
| 2,100,003 | 11/1937 | Foster | 249/79 |
| 2,219,864 | 10/1940 | Dostal | 249/79 |
| 2,576,749 | 11/1951 | Carpentier | 264/DIG. 3 |
| 3,099,516 | 7/1963 | Henrickson | 264/54 X |
| 3,154,606 | 10/1964 | Morecroft et al. | 264/54 |
| 3,375,865 | 4/1968 | Boichenko et al. | 249/79 X |
| 3,836,110 | 9/1974 | Osinsky et al. | 249/79 |

Primary Examiner—Philip E. Anderson
Attorney, Agent, or Firm—Howard C. Miskin

[57] ABSTRACT

A cellular polymeric resin sheet, slab or the like is produced by filling a pressure resistant receptacle having a cover directly releasably locked thereto with a uniform mixture of a resin such as polyvinyl chloride, a finely divided heat activated first gas generator and preferably a water activated second gas generator together with other additives such as plasticizers, stabilizers, etc. The closed receptacle is heated to effect the gelation and fusion of the resin and the activation of the first gas generator to produce a high density uniform small pore cellular resin body embryo under high pressure in the receptacle. The receptacle and embryo are cooled, the receptacle opened and the embryo removed and subjected to a high humidity atmosphere, preferably at elevated temperature to activate the second gas generator and react therewith. The receptacle may be provided with passageways for the circulation of heating and cooling media and may be provided with heat transfer fins which strengthen the receptacle and is heated and cooled by immersion or exposure to hot and cold fluids. The receptacles may carry electric heating elements for their heating.

11 Claims, 4 Drawing Figures

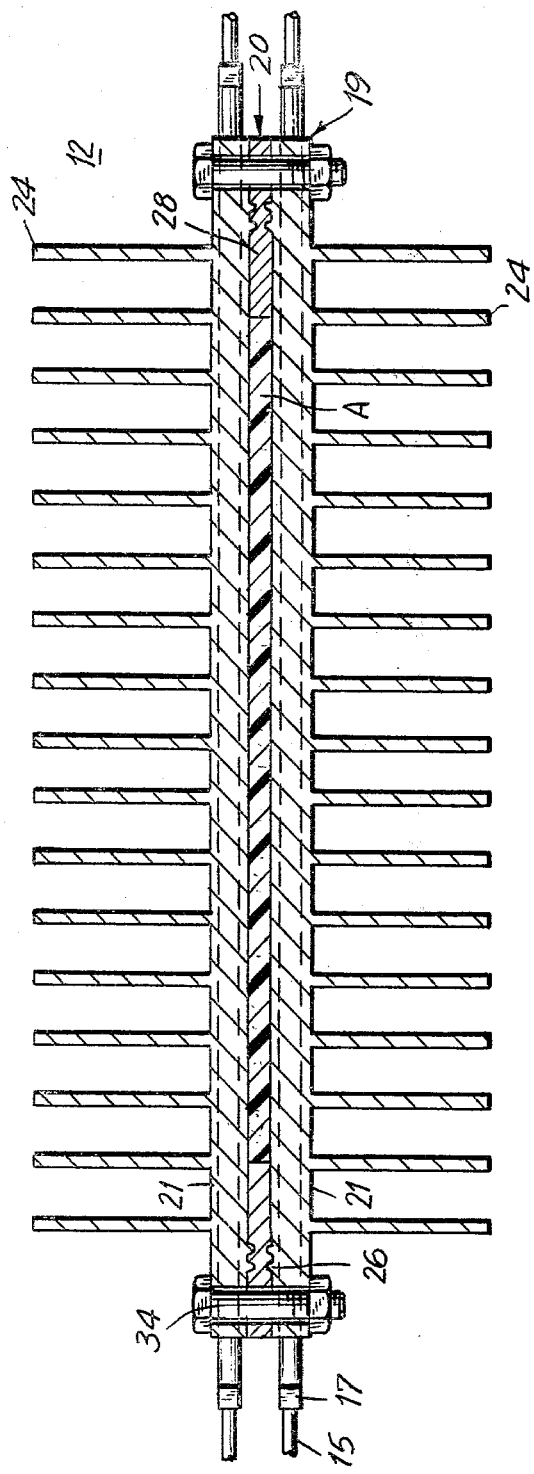
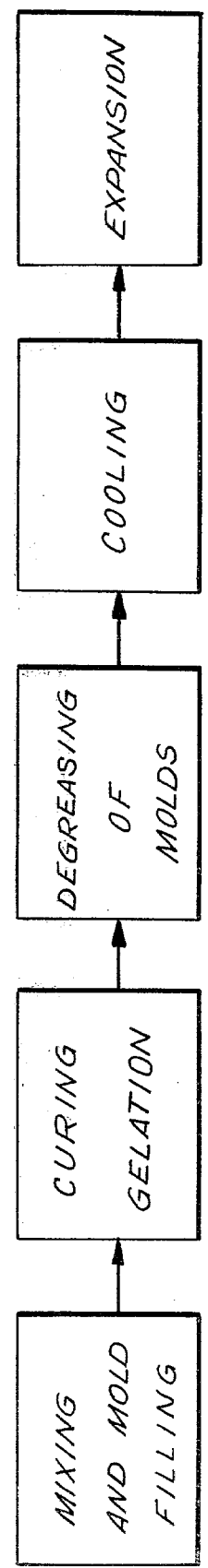
FIG.5

METHOD OF MAKING A CELLULAR POLYMERIC RESIN BODY IN A SELF CONTAINED HIGH-PRESSURE MOLD FORM

This is a continuation of application Ser. No. 929,790, filed July 31, 1978 now abandoned.

BACKGROUND OF THE INVENTION

The present invention relates generally to improvements in the treatment of synthetic organic polymeric resins and it relates more particularly to an improved method for the production of foamed or cellular plastics.

Cellular plastics, particularly of the closed cell type, are widely used in many fields by reason of their high thermal insulation properties, low cost, easy shaping and machinery and wide range of physical properties. They are generally water and chemical resistant and with proper additives weather resistant and may be rigid or of any desired degree of flexibility.

A process for producing cellular products from synthetic organic polymeric resins, particularly polyvinyl chloride, is described in U.S. Pat. No. 2,576,749 granted Nov. 27, 1951 to P. J. Carpentier et al. In accordance with the aforesaid process a dry homogeneous mixture of a polymeric resin, such as polyvinyl chloride, a heat activated blowing agent, and a water activated blowing agent reactant are deposited in a receptacle and placed and restricted in a high pressure hydraulic press in which the mixture is heated to the gelation and fusion temperature of the resin and the activation temperature of the thermal flowing agent or gas generator. The heating step is conventionally performed with the mixture containing forms alternating with heat media circulating plates stacked between the platens of a large hydraulic press which can apply high pressures since the pressure of the gas generated by the blowing agent of the order exceeding 1800 pounds per square inch. Following the fusion of the resin and the uniform generation of small gas containing cells the forms are cooled and the cooled small pore cellular slabs or embryos are removed and subjected to a post treatment which includes exposing the embryo to water steam or moisture to react with the water activated blowing agent which, if the embryo is heated to its plastic state, expands the embryo by an amount depending on the amount of blowing agents in the mixture, the amount of water and the heating of the embryo and some degree of hardening of the resin body, if desired.

While the above process produces a highly satisfactory product with a wide range of properties, such as rigidity, flexibility, density and other characteristics, it possesses numerous drawbacks and disadvantages. It is an expensive process, requiring bulky, awkward and expensive equipment, is of little versatility and adaptability, highly time and skilled labor consuming, and otherwise leaves much to be desired.

SUMMARY OF THE INVENTION

It is a principal object of the present invention to provide an improved method for the production of cellular or expanded synthetic organic polymeric or plastic products.

Another object of the present invention is to provide an improved method for the production of cellular plastic products by the embryo method in which a high density small closed pore cellular mass is initially produced and is then post treated to expand the body and increase the cell size and otherwise change its properties and characteristics.

Still another object of the present invention is to provide an improved method for producing an expanded or cellular vinyl plastic, such as a cellular polyvinyl chloride by the embryo process.

A further object of the present invention is to provide an improved method of the above nature characterized by the great reduction in the cost and bulk of the required equipment over that of conventional procedures, its high efficiency, low labor requirements end products of high quality and uniformity and their great versatility and adaptability.

In a sense, the present invention contemplates an improved method for producing a cellular plastic body in which a fluid composition of a synthetic organic polymeric resin having uniformly distributed therein a finely divided heat reactive or thermal blowing agent or gas generator and a reactant reactive gas generator, for example, a water reactive blowing agent such as a polyisocyanate is deposited in a self contained high pressure vessel or form that is a form having a cover member which is releasably secured directly to the form such as by bolts or other direct securing means and can withstand internal pressures exceeding a few hundred pounds per square inch, preferably in excess of 1000 to 2000 pounds per square inch. The resin composition contained in the closed form is then heated to raise the temperature sufficiently to effect the gelation and fusion of the resin and the activation of the thermal blowing agent which forms uniformly distributed small gas containing cells. Thereafter the form is cooled to solidify the resin and the form is opened and the resulting fine pore resin embryo is removed and post treated. The post treatment may include the conventional tempering or aging steps and the embryo is then exposed to water or steam to react with the water activated blowing agent at a temperature depending on the desired bulk density of the end product as described in the above-identified U.S. Pat. No. 2,576,749.

The present invention also contemplates a variant on the post treatment steps wherein the embryo is placed in a pressurized room or vessel and water saturated steam is injected therein to maintain a temperature between 190° to 200° F. at 25 psi with 100% humidity. The pressure is reduced gradually from 25 psi to atmospheric pressure at a predetermined rate to control the speed of expansion; the higher the density of the material, the slower the pressure reduction.

The high pressure form may be heated electrically by resistance elements imbedded in the forms or by circulating a heating medium through passageways in the form or by exposing or immersing the form to a hot vapor or fluid and may be cooled by circulating a cooling medium through the passageways, when provided, or by immersion or exposure to a cooling liquid. The process may be of a continuous or semicontinuous nature.

With the present improved method the conventionally employed hydraulic press which is very bulky and expensive and limits the method to a batch procedure is obviated with a resulting decrease in the cost of the equipment, an increase in process efficiency and a decrease in labor consumption and a high versatility and adaptability.

BRIEF DESCRIPTION OF THE DRAWINGS

FIG. 2 is a longitudinal sectional view of a high pressure form used in the apparatus shown in FIG. 1;

FIG. 5 is a block diagram of a procedure in accordance with the present invention.

DESCRIPTION OF THE PREFERRED EMBODIMENTS

Figure 1:
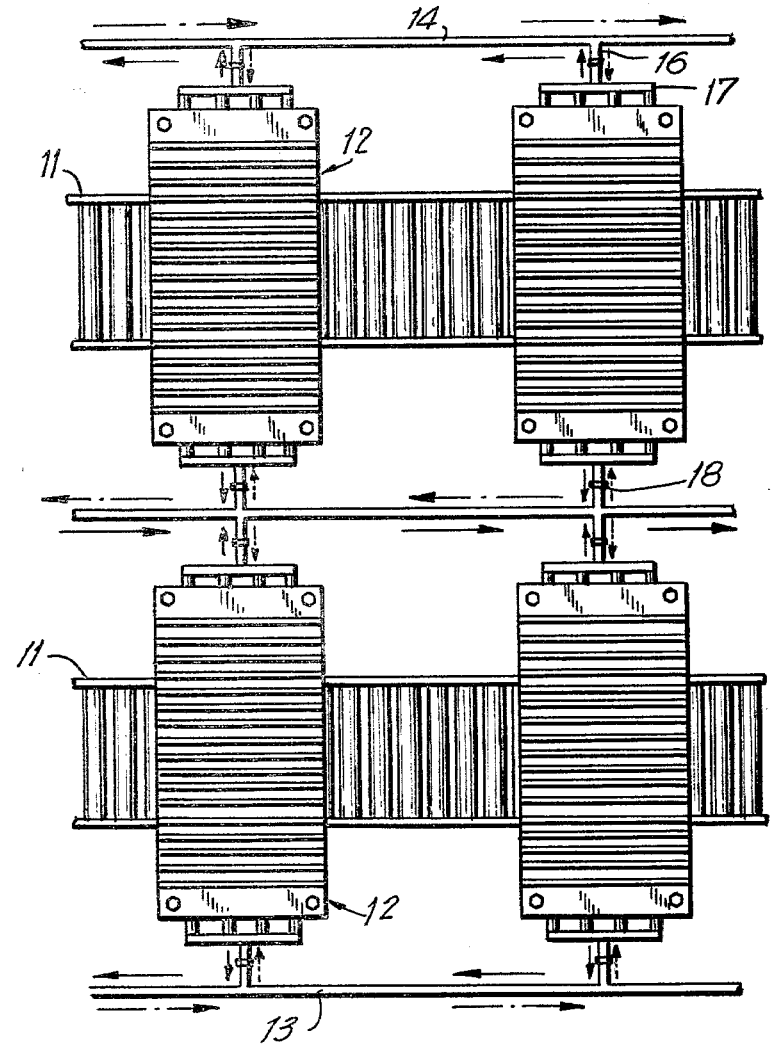
FIG. 1 is a fragmentary top plan view of an improved apparatus for practicing the present improved method.
Figure 4:
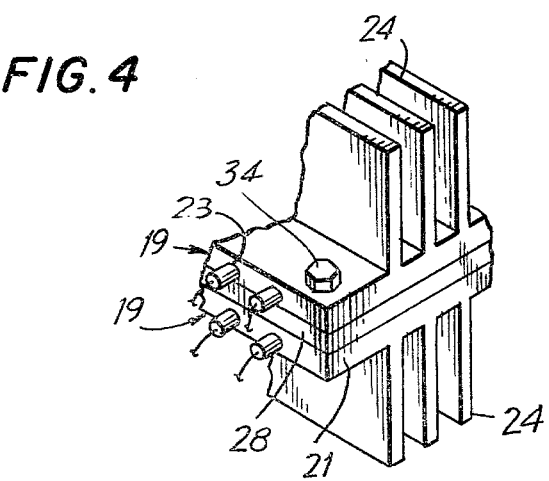
FIG. 4 is a fragmentary perspective view of a corner of the closed assembled form.
Figure 3:
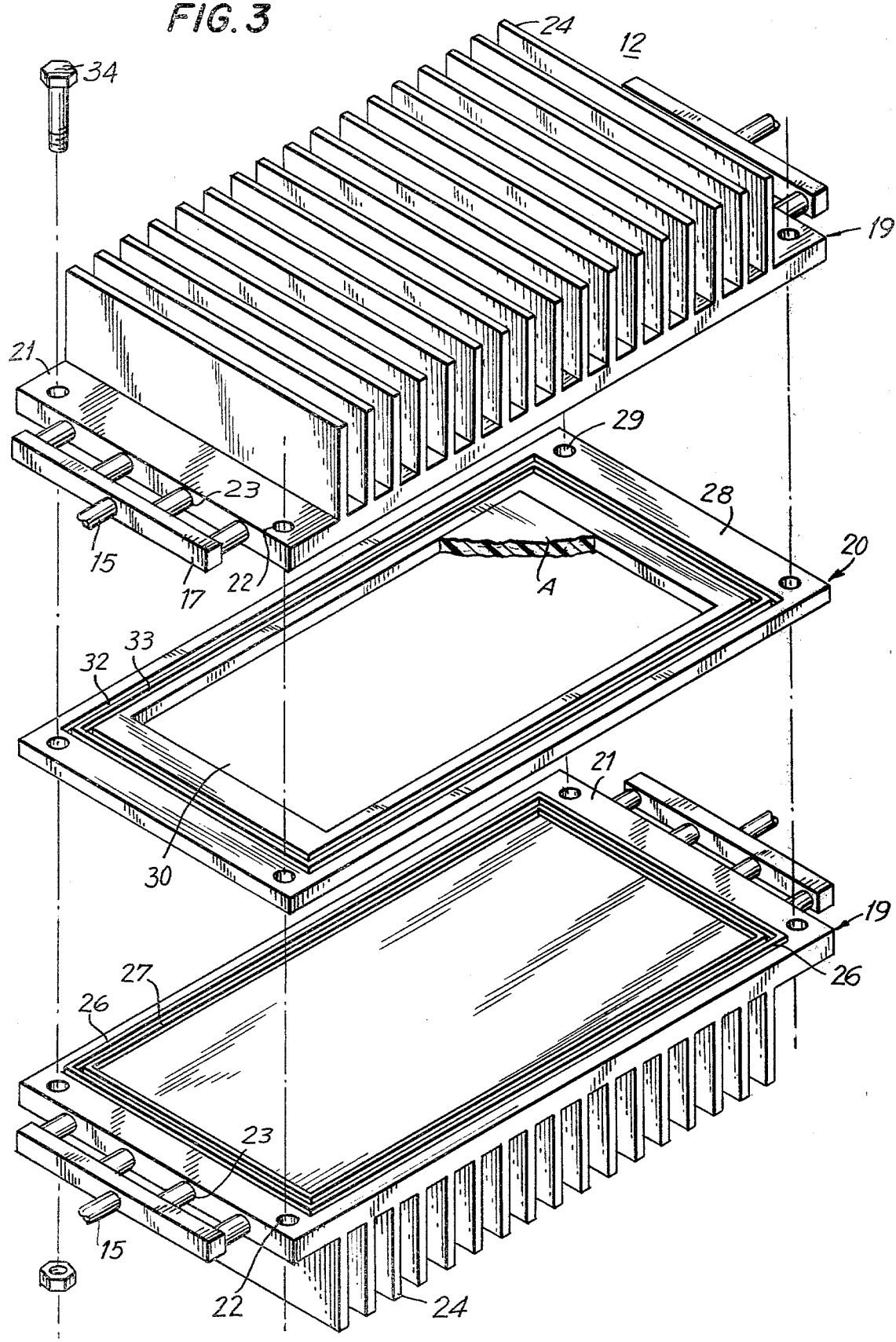
FIG. 3 is an exploded perspective view of the form.

Referring now to the drawings, particularly FIGS. 1 to 4 thereof which illustrate a preferred embodiment of the present invention, the reference numeral 10 generally designates the improved apparatus which includes a conveyor 11, a plurality of modular high pressure forms 12 which are hermetically closable and a heating and cooling media distributing network 13. The conveyor 11 is illustrated as a pair of transversely spaced roller type conveyors although it should be noted that other type conveyors may be employed and one or more conveyors may be used. Moreover, the forms 12 are advanced along the conveyors 11, longitudinally spaced or end-to-end and may be manually or automatically advanced.

The heating and cooling media distributing and circulating network includes a plurality of longitudinally extending main pipes 14 provided with regularly longitudinally spaced branches having connecting members 16 projecting toward respective conveyors 11 and including distributing manifolds 17, each terminating in a plurality of regularly longitudinally spaced transversely directed fluid coupling 18.

Each of the pressure forms 12 is formed of a suitable high strength, corrosion resistant, preferably light weight metal and includes top and bottom head members 19 of similar construction and an intermediate shape delineating frame member 20. Each of the head members 19 comprises a rectangular plate 21 having coupling openings 22 at each of their corners and regularly longitudinally spaced parallel transversely extending fluid circulating through passageways or bores 23, which advantageously are connected to a manifold 17 having a single input connection 15.

Formed on the outside face of each plate 21 and integral therewith are outwardly directed longitudinally spaced transversely extending parallel fins 24 which are transverse to respective circulating bores 23 and which function as plate reinforcing members as well as heat transfer members. If desired, bores 23 could be placed parallel to fins 24 and aligned therewith to aid in the transfer of heat or cold. Along the borders of the inside face of each plate 21 longitudinally inwardly of openings 22 and parallel to the respective edges thereof are respective pairs of integrally formed laterally spaced ridges 26 separated by correspondingly shaped grooves 27 and joined at their respective ends.

The frame member 20 comprises a flat plate 28 of the desired thickness and with a rectangular perimeter the same as that of head plates 21 and having coupling openings 29 at its corners corresponding to and spaced similar to openings 22. A form opening 30 is delineated by the inside edges of plate frame 28 and is preferably rectangular, as illustrated, or it may be of any other desired configuration. Formed along the outer borders of the opposite faces of frame plate 28 and parallel to the edges thereof are pairs of laterally spaced grooves 32 separated by a correspondingly shaped ridge 33. When the frame member 20 is sandwiched between head members 19 in their assembled condition the ridges and grooves 33 and 32 snugly mate with the respective corresponding grooves and ridges 27 and 26 respectively to form a fluid tight strong coupling with the confronting faces of the head and frame plates 21 and 28 being in superimposed engagement. It should be noted by providing frame members 20 of different thicknesses and with openings 30 of different shapes which may replace frame members 20 cellular embryos of different shapes and thicknesses may be produced although rectangular slabs are preferred. Moreover, by positioning shims or inserts in the frame member 20 overlying the bottom head member 19 the thickness of the embryo slab may be reduced as desired and the outline thereof may be reduced by telescoping the frame member opening 30 with a frame member having a differently shaped or dimensioned opening.

In the assembled condition of the pressure form 12 the frame member 20 is sandwiched between top and bottom head members 19 and releasably locked in closed condition by bolts 34 engaging respective aligned pairs of openings 22 and 29 and tightened by engaging nuts 36.

In the operation of the apparatus described above, an open form 12, that is with frame member 20 matingly superimposed on bottom head member 19, is filled with a dry cellular plastic precursor material of the composition described in the aforesaid patent, preferably in a plastisol state, for example a polyvinyl chloride resin having uniformly distributed therein in a finely divided state a thermal blowing agent and an isocyanate which functions as a water activated blowing agent reactant. The top head member 19 is then matingly superimposed on the frame member 20 and the assembly is firmly locked by the bolts and nuts 34 and 36.

The suitably supported filled and locked forms 12 are then advanced along the conveyor 11 into registry with respective connecting members 16 which couple with input connection 15 on headers of manifolds 17 which are coupled to the respective bores 23. The forms 12 and their contents are then heated by circulating a hot vapor or liquid by means of pipes 14 and suitable pumps and valves which may be automatically timed and controlled to raise the temperature of the resin to its gelation and fusion point and to activate the thermal blowing agent. Thereafter the heating medium circulated through the network 13 is replaced by a cold cooling medium until the resin is sufficiently cooled and solidified. the bolts and nuts 34 and 36 are then loosened and removed, at least the top head member separated to open the form and the cellular plastic embryo slab A removed and post treated in the manner described in the aforesaid patent or otherwise. The above procedure is continuously repeated to produce embryo slab A.

It should be noted that while in the above described procedure the forms 12 are heated and cooled by the circulation of heating and cooling media through the bores 23 they may be otherwise heated and cooled. For example the forms may be heated electrically by resistance heating elements imbedded in plates 21 or they may be externally electrically heated or exposed to hot gases or vapors or immersed in hot liquids whose temperatures are automatically controlled. Moreover the cooling may be effected by circulating refrigerated or room temperature gases or vapors about the forms 12 or by immersing the forms in cooled liquids or by applying liquified gases such as nitrogen thereto. In the case where the heating and/or cooling are externally effected the fins 24 increase the heat transfer between the form 12 and the cooling medium.

In FIG. 5 there is shown a block diagram of the procedure where external heating and cooling are effected. The blowing agent containing resin composition is produced and deposited in the open form 12 which is then closed and heated by immersion in or exposure to a hot oil or organic fluid to effect the curing, gelation and fusion of the resin and the activation of the thermal blowing agent. The forms are then degreased, that is the oil or organic fluid is suitably removed therefrom by any conventional procedure. The forms are then cooled and opened and the embryo cellular resin slabs removed and suitably aged and tempered. Thereafter the slabs are exposed to hot water or steam to soften the resin and activate the water activated blowing agent to expand the slab to its final desired bulk density.

While one type of locking construction was shown, other types strong enough to withstand the high pressures produced may be used, such as clamps. Also, while a three piece mold was illustrated in a preferred embodiment, two piece molds may be used. The cavity volume may be decreased by adding inserts to reduce the length, width, and depth, which in turn reduces the size of the embryo. As discussed above, the final size and density of the finished product is related to the initial size of the embryo. The frame member 20 and bottom head 19 form a receptacle into which the composition is deposited. Also form 12 could be considered a mold.

While there have been described and illustrated preferred embodiments of the present invention, it is apparent that numerous alterations, omissions and additions may be made without departing from the spirit thereof.

I claim:

1. The method of producing a cellular synthetic organic polymeric body comprising the steps of depositing into an open high pressure receptacle a foamable polyvinyl chloride plastisol synthetic organic thermoplastic resin composition having dispersed therein in a finely divided state a thermal first gas blowing agent and an isocyanate which functions as a water activatable gas generating composition second blowing agent reactant, closing said receptacle to form a closed, fluid tight self contained mold form resistant to a predetermined internal pressure of at least a few thousand pounds per square inch, in the absence of any external press device, heating said self contained closed mold form from an external source of heat to raise the temperature of the contained composition to the gelation temperature of said resin and the heat activation temperature of said first blowing agent to gel, fuse and expand the foamable polyvinyl chloride plastisol resin composition and thereby produce a high internal pressure in said mold form not exceeding said predetermined internal pressure, cooling said form and the contents thereof, opening said form and removing the resulting embryo cellular thermoplastic body and thereafter exposing said embryo body to and maintaining contact with water to activate said second blowing agent gas generating composition.

2. The method of claim 1 wherein said embryo body is exposed to said water at a temperature sufficient to soften said resin.

3. The method of claim 1 wherein said mold form has passageways in the walls thereof and said heating and cooling is effected by circulating heating and cooling media successively through said passageways.

4. The method of claim 1 wherein said mold form is heated and cooled by successively exposing said form to heating and cooling media.

5. The method of claim 4 wherein said mold form includes opposite end plates and a plurality of outwardly directed fins integrally formed with the outer faces of said end plates to increase the heat transfer between said form and said heating and cooling media.

6. The method of claim 1 wherein said closed mold form is transported to said source of heat.

7. The method of claim 1 wherein said heated form is transported to a cooling source to cool said form and contents thereof.

8. The method of claim 1 wherein said closed form is transported to said source of heat, then said form is transported to said source of cooling said heated form.

9. The method of claim 5 wherein said closed mold form is transported to said source of heat and then thereafter transported to said source of cooling.

10. The method of claim 6 wherein said source of heat is removed and said source of cooling is applied to said form and thereafter said closed mold form is moved to another station for opening said form.

11. The method of producing a cellular synthetic organic polymeric body comprising the steps of depositing into an externally finned open high pressure receptacle a foamable polyvinyl chloride plastisol synthetic organic thermoplastic resin composition having dispersed therein in a finely divided state a thermal first gas blowing agent and a water activatable gas generating isocyanate composition second blowing agent reactant, closing said receptacle to form a closed, fluid tight self contained mold form resistant to a predetermined internal pressure of at least a few thousand pounds per square inch and obviate the use of a press device, heating said self contained closed mold form from an external source of heat to raise the temperature of the contained composition to the gelation temperature of said resin and the heat activation temperature of said first blowing agent to gell, fuse and expand the foamable polyvinyl chloride plastisol resin composition, and thereby produce a high internal pressure in said form not exceeding said predetermined internal pressure cooling said form and the contents thereof, opening said mold form and removing the resulting embryo cellular thermoplastic body and thereafter subjecting said embryo body to the action of water vapor at an elevated temperature to react with said isocyanate second blowing agent gas generating composition whereby carbon dioxide is liberated within said embryo body and said embryo body is further expanded.

* * * * *